United States Patent
Cherny et al.

(10) Patent No.: US 10,534,915 B2
(45) Date of Patent: Jan. 14, 2020

(54) SYSTEM FOR VIRTUAL PATCHING SECURITY VULNERABILITIES IN SOFTWARE CONTAINERS

(71) Applicant: Aqua Security Software, Ltd., Ramat Gan (IL)

(72) Inventors: Michael Cherny, Ramat Gan (IL); Sagie Dulce, Tel Aviv (IL)

(73) Assignee: AQUA SECURITY SOFTWARE, LTD. (IL)

( * ) Notice: Subject to any disclaimer, the term of this patent is extended or adjusted under 35 U.S.C. 154(b) by 246 days.

(21) Appl. No.: 15/636,694

(22) Filed: Jun. 29, 2017

(65) Prior Publication Data
US 2019/0005246 A1 Jan. 3, 2019

(51) Int. Cl.
| | |
|---|---|
| *H04L 29/06* | (2006.01) |
| *G06F 21/57* | (2013.01) |
| *G06F 21/50* | (2013.01) |
| *G06F 11/36* | (2006.01) |
| *G06F 21/55* | (2013.01) |

(52) U.S. Cl.
CPC ............ *G06F 21/577* (2013.01); *G06F 21/50* (2013.01); *G06F 21/57* (2013.01); *G06F 11/3612* (2013.01); *G06F 21/554* (2013.01); *G06F 2221/033* (2013.01); *H04L 63/1433* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,904,959 | B2 * | 3/2011 | Sidiroglou | G06F 21/554 726/22 |
| 9,064,134 | B1 * | 6/2015 | Agarwal | G06F 21/577 |
| 9,742,801 | B1 * | 8/2017 | Smith | G06F 16/2474 |
| 9,754,105 | B1 * | 9/2017 | Lopez-Chicheri | G06F 21/55 |
| 2005/0198110 | A1 * | 9/2005 | Garms | H04L 63/1408 709/202 |
| 2008/0178287 | A1 * | 7/2008 | Akulavenkatavara | G06F 11/3644 726/22 |
| 2013/0019314 | A1 * | 1/2013 | Ji | H04L 67/02 726/25 |

* cited by examiner

*Primary Examiner* — Khoi V Le
(74) *Attorney, Agent, or Firm* — Carlson, Gaskey & Olds, P.C.

(57) ABSTRACT

An example computer-implemented method of preventing exploitation of software vulnerabilities includes determining that a software container is susceptible to a vulnerability, determining one or more soft spots required to exploit the vulnerability, and analyzing runtime behavior of the software container to determine if the software container uses the one or more soft spots. The method includes automatically applying a security policy that prevents the software container from using the one or more soft spots based on the analyzing indicating that the software container does not use the one or more soft spots at runtime.

17 Claims, 3 Drawing Sheets

SYSTEM FOR VIRTUAL PATCHING SECURITY VULNERABILITIES IN SOFTWARE CONTAINERS

BACKGROUND

This application relates to software containers, and more particularly to security features for software containers.

Virtual machines have gained popularity for a variety of computing tasks. A virtual machine is a software implementation of a physical machine that executes programs like a physical machine. A typical virtual machine includes an entire additional operating system that runs on top of a host operating system, and one or more applications that run within that additional operating system. Virtual machines enable administrators to run several operating system instances at the same time on a single server. A specialized application called a hypervisor manages the virtual machines that run on a given server. Running multiple operating system instances on a single physical machine, however, is resource-intensive.

More recently, software containers are being used as an alternative to running multiple virtual machines. Software containers allow administrators to virtualize a single application rather than an entire operating system. A software container includes a software application plus dependencies required to run the application bundled into one package. The dependencies may include libraries, binaries, and/or configuration files, for example. By containerizing the application and its dependencies, differences in operating system distributions and underlying infrastructure are abstracted away, making it easy to migrate an application between various environments (e.g., development, testing, and production). Multiple containers can be run in isolation from each other on a single host operating system, which provides an alternative to running multiple virtual machines and their accompanying operating systems on a single server. Because software containers allow an administrator to virtualize a single application rather than an entire operating system, running a given quantity of software containers is less resource intensive than running the same quantity of virtual machines. One platform for building and running software containers is DOCKER.

As is the case with non-containerized software, software containers can be susceptible to software security vulnerabilities, which are security flaws, glitches, or weaknesses found in software that can be exploited. Software security vulnerabilities are often software bugs, for example not checking user input size.

Enterprises seek visibility into which vulnerabilities exist in software within their infrastructure for security and compliance reasons. Although security is important, in many cases the main driver is compliance, because business continuity may depend on being able to prove to auditors that one's company is compliant with all relevant regulations. As an example, the Payment Card Industry Data Security Standard (PCI-DSS) requires that software not have vulnerabilities that are marked as high or medium severity.

The process of sorting through and resolving identified vulnerabilities is a tedious manual process. Scanners are software tools that can be used to identify security vulnerabilities based on, for example, matching known patterns and signatures against software network activity and/or file system layout. Scanners sometimes identify seemingly relevant results that upon a subsequent manual investigation end up not being relevant for a given environment.

The Common Vulnerability Scoring System (CVSS) is a formula to define the severity of a vulnerability. Some administrators use the CVSS to prioritize patching vulnerabilities, but determining these scores can be a tedious process as well.

Applying patches for relevant vulnerabilities can also require a lot of effort, as patching may involve determining a list of patches to be applied (as discussed above), applying those patches, and then testing to determine whether the patched environments still perform as intended. This can cause a potentially large amount of software container downtime.

SUMMARY

One example embodiment of a computer-implemented method of preventing exploitation of software vulnerabilities includes determining that a software container is susceptible to a vulnerability, determining one or more soft spots required to exploit the vulnerability, and analyzing runtime behavior of the software container to determine if the software container uses the one or more soft spots. The method also includes automatically applying a security policy that prevents the software container from using the one or more soft spots based on the analyzing indicating that the software container does not use the one or more soft spots at runtime.

In another example embodiment of the above described method, the method includes providing a notification that a patch to protect the software container against the vulnerability should be applied with a high priority based on the analyzing indicates that the software container does use any of the one or more soft spots at runtime, and providing a notification that a patch to protect the software container against the vulnerability can be applied with a low priority based on the analyzing indicates that the software container does not use any of the one or more soft spots at runtime.

In another example embodiment of any of the above described methods, the method includes, if the analyzing indicates that the software container does use any of the one or more soft spots at runtime, controlling whether use of the software container is allowed or prevented based on a predefined use policy. The controlling includes performing one of:

preventing the software container from running;
allowing the software container to run but preventing the software container from using the one or more soft spots; and
allowing the software container to run and use the one or more soft spots.

In another example embodiment of any of the above described methods, the one or more soft spots comprise access to one or more particular files.

In another example embodiment of any of the above described methods, the one or more soft spots comprise one or more particular system calls.

In another example embodiment of any of the above described methods, the one or more soft spots comprise access to a specific network resource.

In another example embodiment of any of the above described methods, automatically applying a security policy that prevents the software container from using the one or more soft spots includes creating or updating a whitelist for the software container that excludes use of the one or more soft spots by the software container.

In another example embodiment of any of the above described methods, determining that the software container is susceptible to the vulnerability includes scanning the software container, or its corresponding container image, against a list of known vulnerabilities.

In another example embodiment of any of the above described methods, the analyzing and automatically applying are performed by an additional, second software container.

One example computing device includes memory configured to store an image for a software container, and processing circuitry operatively connected to the memory and configured to determine that the software container is susceptible to a vulnerability, determine one or more soft spots required to exploit the vulnerability, and analyze runtime behavior of the software container to determine if the software container uses the one or more soft spots. The processing circuitry is configured to automatically apply a security policy that prevents the software container from using the one or more soft spots based on the analysis indicating that the software container does not use the one or more soft spots at runtime.

In another example embodiment of the above described computing device, the processing circuitry is configured to provide a notification that a patch to protect the software container against the vulnerability should be applied with a high priority based on the analysis indicating that the software container does use any of the one or more soft spots at runtime, and provide a notification that a patch to protect the software container against the vulnerability can be applied with a low priority based on the analysis indicating that the software container does not use any of the one or more soft spots at runtime.

In another example embodiment of any of the above described computing devices, the processing circuitry is configured to, if the analysis indicating that the software container does use any of the one or more soft spots at runtime, control whether use of the software container is allowed or prevented based on a predefined use policy by performing one of:
  preventing the software container from running;
  allowing the software container to run but preventing the software container from using the one or more soft spots; and
  allowing the software container to run and use the one or more soft spots.

In another example embodiment of any of the above described computing devices, the one or more soft spots comprise access to one or more particular files.

In another example embodiment of any of the above described computing devices, the one or more soft spots include one or more particular system calls.

In another example embodiment of any of the above described computing devices, the one or more soft spots include access to a specific network resource.

In another example embodiment of any of the above described computing devices, to automatically apply a security policy that prevents the software container from using the one or more soft spots, the processing circuitry is configured to create or update a whitelist for the software container that excludes use of the one or more soft spots by the software container.

In another example embodiment of any of the above described computing devices, to determine that the software container is susceptible to the vulnerability, the processing circuitry is configured to scan the software container, or its corresponding container image, against a list of known vulnerabilities.

One example embodiment of a computer program product that is stored in a computer-readable medium includes program instructions which, when run on a computing device, configures the computing device to determine that a software container is susceptible to a vulnerability, determine one or more soft spots required to exploit the vulnerability, and analyze runtime behavior of the software container to determine if the software container uses the one or more soft spots. The program instructions configure the computing device to automatically apply a security policy that prevents the software container from using the one or more soft spots based on the analysis indicating that the software container does not use the one or more soft spots at runtime.

In another example embodiment of the above described computer program product, the program instructions configure the computing device to provide a notification that a patch to protect the software container against the vulnerability should be applied with a high priority based on the analysis indicating that the software container does use any of the one or more soft spots at runtime, and provide a notification that a patch to protect the software container against the vulnerability can be applied with a low priority based on the analysis indicating that the software container does not use any of the one or more soft spots at runtime.

In another example embodiment of any of the above described computer program products, the program instructions configure the computing device to, if the analysis indicates that the software container does use any of the one or more soft spots at runtime, control whether use of the software container is allowed or prevented based on a predefined use policy by performing one of:
  preventing the software container from running;
  allowing the software container to run but preventing the software container from using the one or more soft spots; and
  allowing the software container to run and use the one or more soft spots.

These and other features may be best understood from the following drawings and specification.

The embodiments described herein may be taken independently or in any combination. Features described in connection with one embodiment are applicable to all embodiments, unless such features are incompatible.

DETAILED DESCRIPTION

Figure 1:
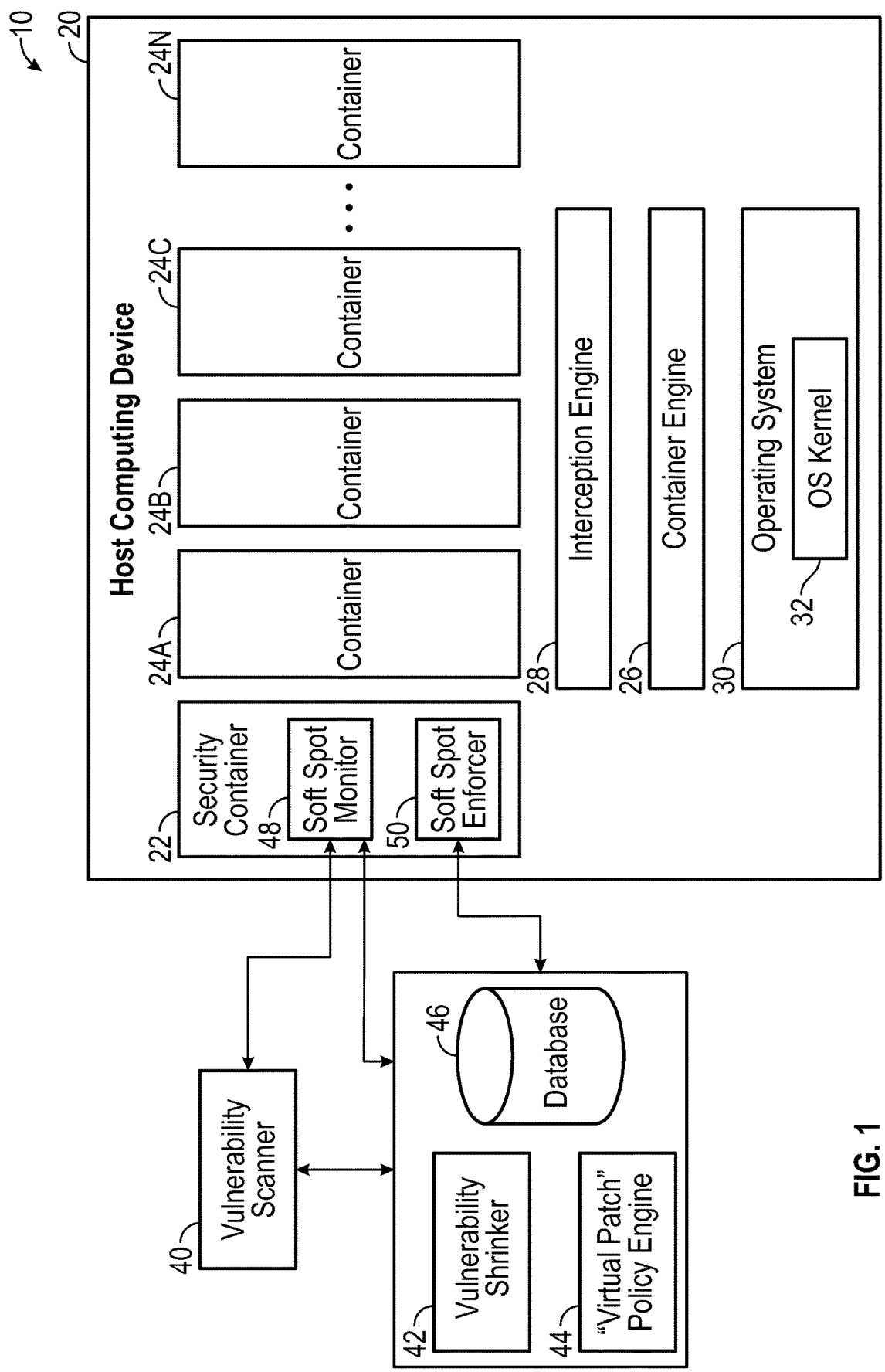
FIG. 1 schematically illustrates a system for virtual patching of software vulnerabilities.

FIG. 1 schematically a system 10 for virtual patching of software vulnerabilities. A host computing device 20 provides security features for a plurality of software containers 24A-N. The software containers 24 each include a software application and may also include dependencies that the software application requires to run (e.g., libraries and/or binaries). As will be discussed below in greater detail, an additional security software container 22 is used to provide some of the security features.

The host computing device 20 also includes a container engine 26 and an interception engine 28. The container engine 26 instantiates the software containers 22, 24 from corresponding container images, which creates an environment for the applications that run within the software containers 22, 24 and their dependencies. The container images (not shown in FIG. 1) are files from which containers can be started, and act as snapshots of their corresponding containers and the containerized applications they contain. The container engine 26 also controls an operational state of the software containers 22, 24 (e.g., whether they are running or stopped, or being imported) and also controls preserving a state of the software containers (e.g., container saving and exporting).

The host computing device 20 includes an operating system (OS) 30 having an OS kernel 32. The interception engine 28 is configured to detect various resource requests amongst the software containers 24, and/or between the software containers 24 and the OS kernel 32. In one example, the operating system 30 is a LINUX or WINDOWS-based operating system, and the container engine 26 is DOCKER. Of course, it is understood that these are only non-limiting examples, and that other operating systems and other container engines could be used. Also, it is understood that other quantities of containers 24 could be supported by the host computing device 20 than the quantity depicted in FIG. 1.

The security software container 22 includes a software application and may also include dependencies that the software application requires to run (e.g., libraries and/or binaries). The interception engine 28 is operable to monitor operation of the software containers 24 and detect when the software containers 24 attempt an action, and can utilize the security container 22 to intervene if necessary to stop the action. In some examples, the interception engine 28 has low level hooks into the OS 30 at the level of the OS kernel 32, which allow the interception engine 28 to catch low-level system calls before they are executed by the OS kernel 32. Such hooks may be implemented through techniques such as kernel module proxying, system call replacement, process instrumentation, or the like.

A vulnerability scanner 40 is operable to perform static scans of the container images in uninstantiated form and/or dynamic scans of the software containers 24 at runtime, to detect whether the software containers 24 are susceptible to known software vulnerabilities. The scanning results provided by the vulnerability scanner 40 may in some examples be over-inclusive, because the results may not reflect actual runtime operation of the software containers 24. For example, the vulnerability scanner 40 may identify a potential vulnerability based on one or more files present in the software containers 24 or accessible to the software containers 24, but that the software containers 24 do not actually use.

As discussed above, the software containers 24 may include one or more libraries that work on top of the operating system 30 and support operation of the software containers 24. Some example libraries may include OpenSSL, PaxUtils, or GLIBC, for example. While a given vulnerability may exist for software in the software containers 24, such as one of its libraries, the vulnerability may be of minimal relevance in situations where the affected library is not used at all, or is not used in a way needed to exploit the vulnerability.

In the prior art, identifying which vulnerabilities are present in a container and are actually relevant was a tedious process requiring a large amount of manual work. This is problematic, because the risk of a software vulnerability being exploited increases the longer the vulnerability is present. Moreover, for vulnerabilities that are of little to no relevance to actual operations of a company's software container 24, taking those software containers 24 offline for patching can negatively affect the revenue and/or reputation of the company.

These types of problems are particularly acute for containerized environments, where the number of unique container images grows exponentially, and the number of simultaneously running containers may be larger by a few orders of magnitude compared to a quantity of running virtual machines that may be running if containers were not used.

The present disclosure describes techniques that combine scanning results with actual software behavior to generate a list of the most relevant vulnerabilities on the one hand, and to provide security runtime policy enforcement that prevents other discovered but less relevant vulnerabilities from being exploited. The "perimeter" of a vulnerability is determined by analyzing its "soft spots," which are components required to actually exploit the vulnerability, such as files (e.g., executables), network resources, and/or system calls. Without access to the necessary soft spots, a vulnerability is not exploitable.

An actual runtime impact of the vulnerability is determined by analyzing container behavior, in real time in some examples. Container activity is tracked to discover actual exploitability of soft spots and actual impact/relevance of the vulnerability. For example, if a soft spot requires network access, and a software container 24 does not use the network, then the actual impact of the vulnerability is very low.

For low impact vulnerabilities, the soft spots are "shrink wrapped" by removing the privileges around those soft spots, so that the vulnerability cannot be exploited at runtime. This ensures that even if a soft spot exists, an attacker cannot leverage a vulnerability requiring the soft spot because access to the soft spot will be denied at runtime, rendering the vulnerability non-exploitable.

As discussed in further detail below, the system 10 can be used to shorten the time of exposure to software vulnerabilities, reduce developer and/or computational resources required to respond to vulnerabilities, and minimize container downtime for patching.

Figure 2:
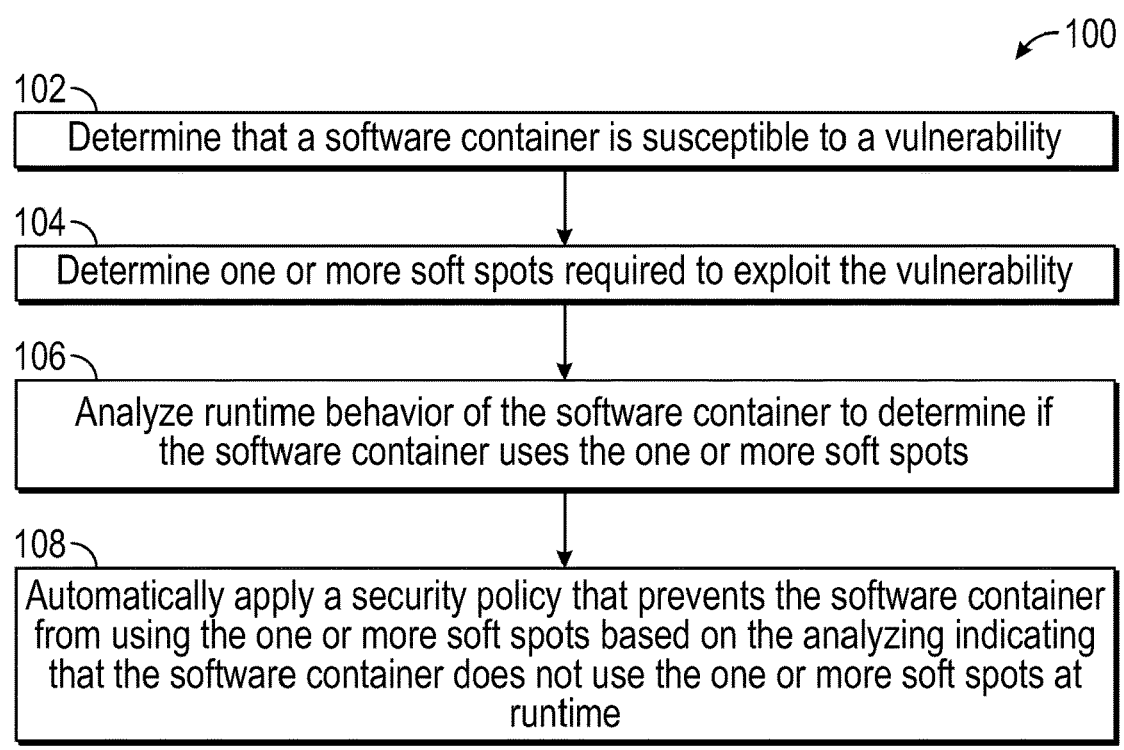
FIG. 2 is a flow chart of an example method of preventing exploitation of software vulnerabilities.

FIG. 2 is a flow chart of an example method 100 of preventing exploitation of software vulnerabilities. A determination is made that a software container 24 is susceptible to a vulnerability (block 102), and a determination is made of one or more "soft spots" required to exploit the vulnerability (block 104). Runtime behavior of the software container 24 is analyzed to determine if the software container 24 uses the one or more soft spots (block 106). A security policy that prevents the software container 24 from using the one or more soft spots is automatically applied based on the analysis of block 106 indicating that the software container 24 does not use the one or more soft spots at runtime (block 108). This automatic application of the security policy can be performed prior to application of a patch to protect the software container 24 against the vulnerability, which makes such patching much less urgent because the vulnerability cannot be exploited.

Some example "soft spots" include access to one or more particular files, access to a specific network resource (e.g., a certain network port, a certain network protocol, a specific payload, or a combination thereof), and/or use of one or more particular system calls.

In some examples, application of the security policy is performed by the security container 22 in conjunction with the interception engine 28 without actually modifying the software container 24 that the policy is applied to, because the interception engine 28 is operable to intercept operations of the container before they are executed, and the security container 22 can determine whether any of those operations are prohibited by the automatically applied security policy.

Figure 3:
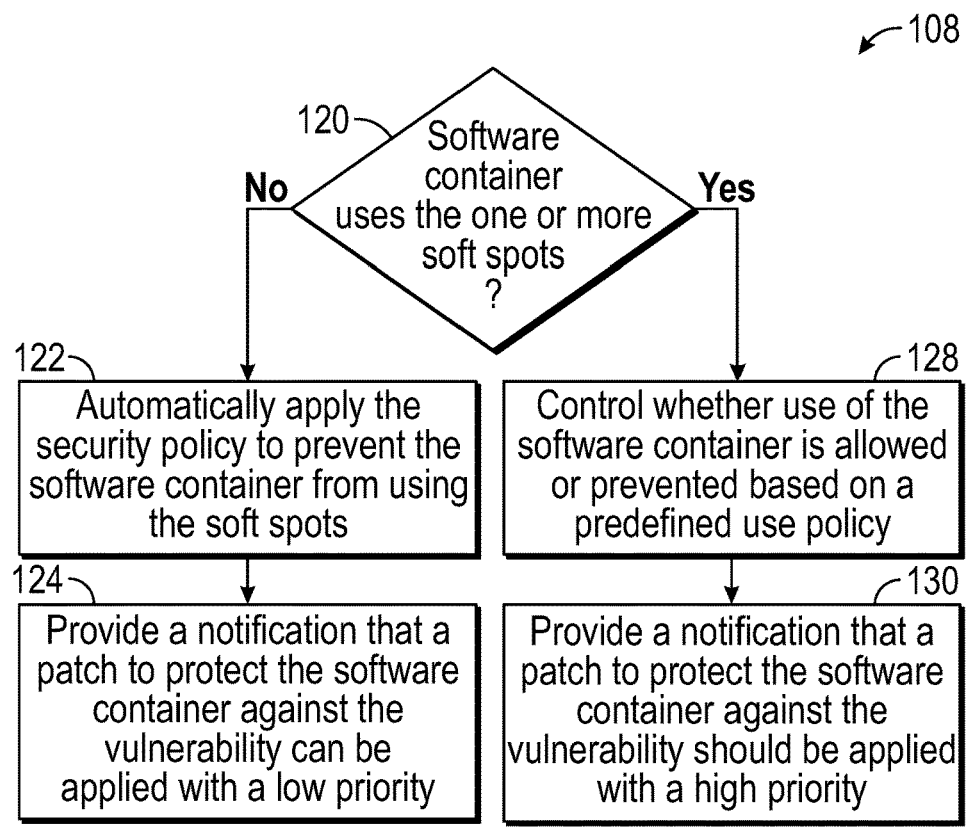
FIG. 3 is a flow chart of an example implementation of a portion of the method of FIG. 2.

Referring now to FIG. 3, an example implementation of block 108 is shown. A determination is made of whether the software container 24 uses the one or more soft spots (block 120). If the software container 24 does not use the one or more soft spots (a "no" to block 120), a security policy is automatically applied that prevents the software container 24 from using the soft spots (block 122), thereby preventing exploitation of the vulnerability by the software container 24. A notification is then provided that a patch for protecting the software container 24 against the vulnerability can be applied with a low priority (block 124). In one example, the notification of block 124 is only provided if the security policy is successfully applied.

If the software container does use the one or more soft spots (a "yes" to block 120), then the method controls whether use of the software container 24 is allowed or prevented based on a predefined use policy (block 128), and a notification is provided that a patch to protect the software container 24 against the vulnerability should be applied with a high priority (block 130).

Controlling whether use of the software container 24 is allowed or prevented (block 128) is also based on whether the software container 24 is running in some examples, and includes performing one of:
    preventing the software container 24 from running;
    allowing the software container 24 to run but preventing the software container 24 from using the one or more soft spots; and
    allowing the software container 24 to run and use the one or more soft spots.

Thus, the controlling of block 128 could include preventing or allowing an entire software container 24, or just parts of the software container 24, to run. An example predefined use policy may require one or more of the following for block 128:
    if the software container 24 is already running, let the software container 24 continue operating without being stopped,
    if the software container 24 is already running, let the software container 24 continue operating but stop any process that is likely to attempt to use the one or more soft spots from executing (e.g., stopping a specific process, or on an even more granular level stop a specific system call and/or use of a specific network resource),
    if the software container 24 is stopped, prevent it from starting,
    if the software container is stopped, automatically apply a software patch in addition to or as an alternative to application of the security policy in block 108, and/or
    if the software container is stopped, let the software container 24 start but prevent any processes that is likely to attempt to use the one or more soft spots from executing (e.g., prevent a specific process, or on an even more granular level preventing a specific system call and/or use of a specific network resource).

The notifications of blocks 124, 130 may be provided to an administrator of a given software container 24, for example. The notifications help the administrator determine which patches should be applied with a high priority (e.g., high urgency), and which can be patched with a low priority (e.g., low urgency). The administrator may wish to postpone low priority patching until there is a high priority patch to apply, thereby minimizing software container 24 downtime. In this manner, one or more low priority patches could be accumulated and applied all at once, instead of repeatedly taking the software container 24 offline for each individual low priority patch.

In some examples, the high priority patches may be applied automatically. However, in some examples, it may be desirable to let an administrator choose when to apply the patches, because applying a patch may incur some downtime of the software container 24 being patched.

The determination that a software container 24 is susceptible to a vulnerability (block 102) may be performed based on scanning results from the vulnerability scanner 40 shown in FIG. 1. The results can be based on static scanning of container images and/or dynamic scanning of running software containers 24, for example. The vulnerability scanner 40 scans software container images and/or running software containers 24 for vulnerabilities, and determines the soft spots required to exploit those vulnerabilities.

A soft spot monitor 48 analyzes runtime behavior of the software containers 24 to determine whether the software containers 24 actually use the one or more soft spots. In some examples, the soft spot monitor 48 analyzes runtime behavior of software containers 24 based on historic behavior of the software container 24 (e.g., based on log files). In other examples, the soft spot monitor 48 analyzes runtime behavior of software containers 24 based on present live monitoring of the software containers 24 during an examination period.

The soft spots for a given vulnerability are communicated to a vulnerability shrinker 42. The vulnerability shrinker 42 cross-references the soft spots identified by vulnerability scanner 40 with the runtime behavior analysis from soft spot monitor 48 to determine whether a given software container uses the one or more soft spots of a given vulnerability (block 106). The vulnerability shrinker 42 indicates the vulnerabilities having soft spots that are used by a given software container 24, and which should be patched with a high priority. The vulnerability shrinker 42 also indicates the vulnerabilities for which no soft spots are used by the given software container 24, and which can be addressed at least in the short term by preventing use of the soft spots through application of a security policy without application of a patch for the vulnerability.

A "virtual patch" policy engine 44 provides a policy to be applied in block 122 based on input from the vulnerability shrinker 42. This can include creation of a new policy, or updating an existing policy, for example. A database 46 stores scanning results and/or policies created by the virtual patch policy engine 44.

In one example, the virtual patch policy engine 44 uses whitelists that clearly delineate what operations are permitted by a given software container 24, while excluding the soft spots of an identified and relevant vulnerability from that list, to thereby exclude use of the one or more soft spots. Of course, other types of policies can be used as well.

A soft spot enforcer 50 enforces the automatically applied security policies. The soft spot enforcer 50 monitors the software containers 24 for attempted usage of spot spots of known vulnerabilities, and works in conjunction with interception engine 28 to prevent such usage.

In some examples, a software vulnerability may reside in the underlying operating system 30, such as in the OS kernel 32. The runtime soft spot monitor 48 may still be used to prevent exploitation of such a vulnerability by preventing container behavior that would be required for exploitation.

As an example, "Dirty COW" is a vulnerability in the Linux kernel that requires execution of a particular pattern of system calls with certain parameters to exploit a "race condition" in the implementation of the copy-on-write mechanism of the kernel's memory management subsystem. These particular system calls, either individually, or collectively, form at least one soft spot of the "Dirty COW" vulnerability. If the soft spot(s) is/are not used by a given software container 24 during normal runtime operations, use of the particular system calls can be prohibited by automatically applying a security policy to prevent access to the soft spot(s) (block 122). In some examples this includes barring only execution of the specific system calls in the order required to execute the vulnerability. In other examples, this includes barring execution of those system calls in any order, or even barring any system call.

Another well-known vulnerability is the "ShellShock" vulnerability which requires use of an operating system shell. A soft spot of the "ShellShock" vulnerability is the particular way in which it uses the operating system shell. If that soft spot is not used by a given software container 24 during normal runtime operations, then use of the operating system shell in that particular way can be prohibited by automatically applying a security policy to prevent access to the soft spot (block 122). In some examples this includes barring only the specific way that "ShellShock" uses the operating system shell. In other examples, this includes barring execution of the operating system shell at all.

Figure 4:
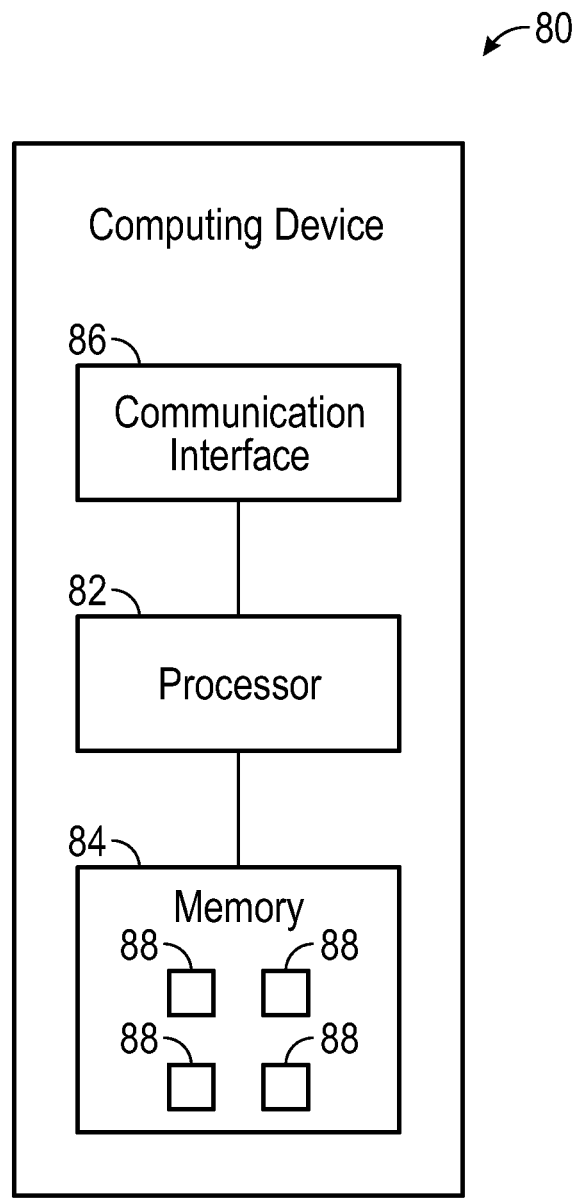
FIG. 4 schematically illustrates an example computing device.

FIG. 4 schematically illustrates an example computing device 80 that is configured to perform some or all of the method 100, and may be used to implement the host computing device 20 and, in one example, some or all of components 40-46 of FIG. 1.

The computing device 80 includes a processor 82 that includes processing circuitry to carry out some or all of the steps of method 100. The processor 82 may include one or more microprocessors, microcontrollers, application specific integrated circuits (ASICs), or the like, for example. The computing device 80 also includes memory 84, which can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 84 may incorporate electronic, magnetic, optical, and/or other types of storage media. The memory 84 can also have a distributed architecture, where various components are situated remotely from one another, but can be accessed by the processor 82. The memory 84 stores a plurality of container images 88 which can be instantiated as respective ones of the software containers 22, 24.

A communication interface 86 is configured to facilitate communication with other computing devices (e.g., if the communication interface 86 includes a networking interface) and/or with user input devices (e.g., if the communication interface 86 includes a wired or wireless interface for receiving and/or providing user input). The processor 82 is operatively connected to both the memory 84 and the communication interface 86.

Although items 40-46 are shown as being separate from the host computing device 20 in FIG. 1, in some examples one or more of the components 40-46 are part of the host computing device 20. Also, in some examples one or more of the components 40-46 are part of the security container 22.

The techniques discussed herein provide a number of benefits over the prior art, including, for example, reducing the amount of time that a given software container 24 is susceptible to a vulnerability, helping prioritize the importance of vulnerability patches, and reducing container downtime.

Prior art vulnerability scanners are focused on finding malware on a system, but such solutions allow an exploit to "land" on a target host, potentially allowing the malware to cause harm before it is stopped. Also, prior art scanners tend to be behavior-based. Taking the example of the "ShellShock" vulnerability, a prior art tool would attempt to detect actual execution of the "ShellShock" exploit.

In contrast, the system 10 discussed herein is better equipped to stop exploits from landing on a target host. Using the "ShellShock" vulnerability as an example, a prior art tool may attempt to detect that exploit after it has already occurred by analyzing container behavior, whereas the system 10 disclosed herein could discover that vulnerability and shrink wrap it without actual execution of the vulnerability.

The system 10 also provides a process that in some examples can be fully automated for filtering out and shrink wrapping vulnerabilities whose soft spots are not utilized by a given software container 24. Consider a hypothetical vulnerability that requires network access to be exploited. A prior art tool may treat this vulnerability as it would any other, even if the software container in question lacks network access. The techniques disclosed herein, in contrast, could shrink wrap such a software container 24 having such a vulnerability because the soft spot is not used by the software container 24 at issue, and could designate the vulnerability as a low priority for patching for that software container 24. The shrink wrapping renders the vulnerability non-exploitable so that no external or internal entities (to the software container 24 or host computing device 20) can execute any code or network traffic to exploit the vulnerability.

Thus, even if a prior art tool is able to stop execution of a vulnerability execution, the system 10 is superior because it can prevent soft spot execution before a vulnerability even has a chance to be executed.

It should also be understood that although a particular component arrangement is disclosed in the illustrated embodiments, other arrangements will benefit herefrom. Although particular step sequences are shown, described, and claimed, it should be understood that steps may be performed in any order, separated or combined unless otherwise indicated and will still benefit from the present disclosure. For example, the determination of what soft spots are required to exploit a vulnerability (block 104) may be performed at the same time as, prior to, or after determining that a given software container 24 is susceptible to the vulnerability (block 102).

Although different examples have specific components shown in the illustrations, embodiments of the present disclosure are not limited to those particular combinations. It is possible to use some of the components or features from one of the examples in combination with features or components from another one of the examples.

Also, although a number of example embodiments have been disclosed, a worker of ordinary skill in this art would recognize that certain modifications would come within the scope of this disclosure. For that reason, the following claims should be studied to determine the true scope and content of this disclosure.

What is claimed is:

1. A computer-implemented method of preventing exploitation of software vulnerabilities, comprising:
   determining that a software container is susceptible to a vulnerability;
   determining one or more soft spots required to exploit the vulnerability;
   analyzing runtime behavior of the software container to determine whether the software container uses the one or more soft spots;
   based on the analyzing indicating that the software container does not use the one or more soft spots at runtime: automatically applying a security policy that prevents the software container from using the one or more soft spots, and providing a notification that a patch to protect the software container against the vulnerability can be applied with a low priority; and
   based on the analyzing indicating that the software container does use any of the one or more soft spots at runtime: controlling whether use of the software container is allowed or prevented based on a predefined use policy, and providing a notification that a patch to protect the software container against the vulnerability should be applied with a high priority.

2. The computer-implemented method of claim 1, wherein said controlling comprising performing one of:
   preventing the software container from running;
   allowing the software container to run but preventing the software container from using the one or more soft spots; and
   allowing the software container to run and use the one or more soft spots.

3. The computer-implemented method of claim 1, wherein the one or more soft spots comprise access to one or more particular files.

4. The computer-implemented method of claim 1, wherein the one or more soft spots comprise one or more particular system calls.

5. The computer-implemented method of claim 1, wherein the one or more soft spots comprise access to a specific network resource.

6. The computer-implemented method of claim 1, wherein said automatically applying a security policy that prevents the software container from using the one or more soft spots comprises creating or updating a whitelist for the software container that excludes use of the one or more soft spots by the software container.

7. The computer-implemented method of claim 1, wherein said determining that the software container is susceptible to the vulnerability comprises scanning the software container, or its corresponding container image, against a list of known vulnerabilities.

8. The computer-implemented method of claim 1, wherein said analyzing and said automatically applying are performed by an additional, second software container.

9. A computing device comprising:
   memory configured to store an image for a software container; and
   processing circuitry operatively connected to the memory and configured to:
      determine that the software container is susceptible to a vulnerability;
      determine one or more soft spots required to exploit the vulnerability;
      analyze runtime behavior of the software container to determine whether the software container uses the one or more soft spots;
      based on the analysis indicating that the software container does not use the one or more soft spots at runtime: automatically apply a security policy that prevents the software container from using the one or more soft spots, and provide a notification that a patch to protect the software container against the vulnerability can be applied with a low priority; and
      based on the analysis indicating that the software container does use any of the one or more soft spots at runtime: control whether use of the software container is allowed or prevented based on a predefined use policy, and provide a notification that a patch to protect the software container against the vulnerability should be applied with a high priority.

10. The computing device of claim 9, wherein to control whether use of the software container is allowed or prevented based on the predefined use policy, the processing circuitry is configured to perform one of:
    prevent the software container from running;
    allow the software container to run but preventing the software container from using the one or more soft spots; and
    allow the software container to run and use the one or more soft spots.

11. The computing device of claim 9, wherein the one or more soft spots comprise access to one or more particular files.

12. The computing device of claim 9, wherein the one or more soft spots comprise one or more particular system calls.

13. The computing device of claim 9, wherein the one or more soft spots comprise access to a specific network resource.

14. The computing device of claim 9, wherein to automatically apply a security policy that prevents the software container from using the one or more soft spots, the processing circuitry is configured to create or update a whitelist for the software container that excludes use of the one or more soft spots by the software container.

15. The computing device of claim 9, wherein to determine that the software container is susceptible to the vulnerability, the processing circuitry is configured to scan the software container, or its corresponding container image, against a list of known vulnerabilities.

16. A computer program product stored in a non-transitory computer-readable medium, said computer program product comprising program instructions which, when run on a computing device, configures the computing device to:
    determine that a software container is susceptible to a vulnerability;
    determine one or more soft spots required to exploit the vulnerability;
    analyze runtime behavior of the software container to determine whether the software container uses the one or more soft spots;
    based on the analysis indicating that the software container does not use the one or more soft spots at runtime: automatically apply a security policy that prevents the software container from using the one or more soft spots, and provide a notification that a patch to protect the software container against the vulnerability can be applied with a low priority; and
    based on the analysis indicating that the software container does use any of the one or more soft spots at runtime: control whether use of the software container is allowed or prevented based on a predefined use policy, and provide a notification that a patch to protect the software container against the vulnerability should be applied with a high priority.

17. The computer program product of claim 16, wherein to control whether use of the software container is allowed or prevented based on the predefined use policy, the program instructions configure the computing device to perform one of:

prevent the software container from running;

allow the software container to run but preventing the software container from using the one or more soft spots; and allow the software container to run and use the one or more soft spots.

* * * * *